(No Model.)
A. A. KNUDSON.
INSULATING COMPOUND.
No. 425,615. Patented Apr. 15, 1890.
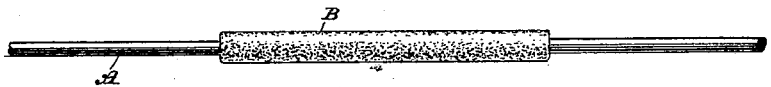
Witnesses:
Inventor
Adolphus A. Knudson
by
Duncan, Curtis & Page,
Attorneys.

UNITED STATES PATENT OFFICE.

ADOLPHUS A. KNUDSON, OF BROOKLYN, NEW YORK.

INSULATING COMPOUND.

SPECIFICATION forming part of Letters Patent No. 425,615, dated April 15, 1890.

Application filed February 15, 1890. Serial No. 340,608. (No specimens.)

*To all whom it may concern:*

Be it known that I, ADOLPHUS A. KNUDSON, a citizen of the United States, residing at Brooklyn, in the county of Kings and State of New York, have invented a certain new and useful Insulating Compound, of which the following is a specification.

I have discovered an insulating material or compound the distinguishing feature of which is the presence therein, as an essential ingredient, of carbolic acid, which is combined with shellac or its equivalent, hereinafter described. This compound exhibits characteristics not found in either of its component parts, and forms a highly useful and valuable material for insulating electrical conductors, whether it be applied directly to the same and used alone as a flexible covering, or in other ways, as for saturating the fibrous coverings employed in the insulation and protection of conducting-wires.

I have secured the best results by using about equal parts of shellac and carbolic acid, the resulting compound being a dense, flexible, and very tough substance resembling india-rubber; but the proportions may be varied, with the result of increasing the flexibility of the compound, by an excess of carbolic acid, and lessening somewhat its tenacity by using a greater proportion of the other ingredient.

I prefer to combine the two substances by heating carbolic acid until it boils slowly or simmers, and then adding the shellac or other insulating material, and stirring it until thoroughly mixed; but I may obtain practically the same results by dissolving the insulating material with a volatile solvent, then mixing it with the carbolic acid, and afterward evaporating out the solvent. Like other insulating compounds, this may be applied while hot to the fibrous materials to be used as coverings for a conductor, or it may be applied directly to a wire to form a coating or covering therefor in the way in which gutta-percha, kerite, and other like substances are applied for a like purpose.

The peculiar advantages of this compound as an insulator I have found to result from the action or effect of the carbolic acid upon the insulating material with which it is combined. For example, using it with shellac, vegetable drying-oils, asphaltum, resins, or similar gums generally, I produce a semi-plastic or slightly plastic mass remarkably tough and tenacious, which is but to a small degree sensitive to extremes or changes of temperature, which presents a hard smooth surface, and which is an excellent insulator.

The invention consists, therefore, in combining with an insulating material, which by heat or by the addition of volatile solvents or menstrua may be brought to a viscous condition, carbolic acid in equal proportions or in a sufficient proportion in each case to impart to said material the physical characteristics which I have above described.

Substances like paraffine, which appear either as solids or as thin fluids without sufficient cohesion to entitle them to classification as "viscous substances," I do not find it desirable to use unless in composition with other substances—such, for example, as asphaltum—inasmuch as their physical characteristics are not substantially changed; nor do they, so far as I have been able to ascertain, unite with the carbolic acid.

The carbolic acid which I use is the ordinary carbolic acid of commerce. This, as is well known, is very impure; but very excellent results are secured by its use. I wish to include, however, under the term "carbolic acid" pure carbolic acid, known also as "phenol," "phenic acid," "phenylic alcohol," or "hydrate of phenyl," as also "creosote," particularly commercial creosote, which appears to consist largely of carbolic acid.

In the accompanying drawing I show a short length of copper or other wire A with a coating B of my improved insulating compound.

What I claim is—

1. A plastic insulating compound consisting of substantially equal proportions of carbolic acid and an insulating substance capable of being brought to a viscous condition, as set forth.

2. A plastic insulating compound consisting of carbolic acid and shellac, or its described equivalent, in substantially the proportions stated.

3. The combination, with an electric conductor, of an insulating or protecting covering consisting of or containing carbolic acid united with an insulating substance, in substantially the proportions set forth.

ADOLPHUS A. KNUDSON.

Witnesses:
PARKER W. PAGE,
ERNEST HOPKINSON.